(12) United States Patent
Bruyndonckx

(10) Patent No.: US 12,048,314 B2
(45) Date of Patent: Jul. 30, 2024

(54) VEGETABLE COATING FOR SELECTED FOOD SUBSTRATES AND SELECTED FOOD SUBSTRATES COATED THEREWITH

(71) Applicant: Griffith Foods International Inc., Alsip, IL (US)

(72) Inventor: Nicole Augusta Maria Bruyndonckx, Nijlen (BE)

(73) Assignee: GRIFFITH FOODS INTERNATIONAL INC., Alsip, IL (US)

( * ) Notice: Subject to any disclaimer, the term of this patent is extended or adjusted under 35 U.S.C. 154(b) by 0 days.

(21) Appl. No.: 17/944,730

(22) Filed: Sep. 14, 2022

(65) Prior Publication Data

US 2023/0217970 A1    Jul. 13, 2023

Related U.S. Application Data

(63) Continuation of application No. 16/315,435, filed as application No. PCT/US2017/039629 on Jun. 28, 2017, now abandoned.

(60) Provisional application No. 62/359,938, filed on Jul. 8, 2016.

(51) Int. Cl.
| | | |
|---|---|---|
| A23L 19/00 | (2016.01) | |
| A23L 13/00 | (2016.01) | |
| A23L 17/00 | (2016.01) | |
| A23L 19/10 | (2016.01) | |
| A23L 33/20 | (2016.01) | |
| A23P 20/12 | (2016.01) | |
| A23P 20/13 | (2016.01) | |

(52) U.S. Cl.
CPC .............. *A23L 19/01* (2016.08); *A23L 13/03* (2016.08); *A23L 17/75* (2016.08); *A23L 19/00* (2016.08); *A23L 19/10* (2016.08); *A23L 19/105* (2016.08); *A23L 33/20* (2016.08); *A23P 20/12* (2016.08); *A23P 20/13* (2016.08)

(58) Field of Classification Search
None
See application file for complete search history.

(56) References Cited

U.S. PATENT DOCUMENTS

| | | |
|---|---|---|
| 3,514,294 A | 5/1970 | Klug et al. |
| 4,053,650 A | 10/1977 | Chino et al. |
| 5,264,238 A | 11/1993 | Taga et al. |
| 5,523,106 A | 6/1996 | Gimmler et al. |
| 7,595,081 B1 | 11/2009 | Bellar |
| 2004/0067282 A1* | 4/2004 | Karwowski .............. A23L 25/25 426/94 |
| 2005/0238791 A1 | 10/2005 | McMindes et al. |
| 2007/0092633 A1 | 4/2007 | Singh |
| 2008/0003331 A1* | 1/2008 | Zhao ........................ A23P 20/12 426/523 |
| 2009/0191313 A1* | 7/2009 | Lykomitros ............. A23P 20/10 426/89 |
| 2011/0142999 A1 | 6/2011 | Wind et al. |
| 2012/0288590 A1* | 11/2012 | Soane ................... A23L 29/212 426/243 |
| 2015/0181917 A1 | 7/2015 | Chang |
| 2015/0257417 A1 | 9/2015 | Woll et al. |
| 2015/0264971 A1 | 9/2015 | Saunders et al. |

FOREIGN PATENT DOCUMENTS

| | | | |
|---|---|---|---|
| BE | 1016622 A3 * | 3/2007 | ............. A23L 25/25 |
| EP | 0542510 A1 | 5/1993 | |
| JP | H 08332033 A | 12/1996 | |
| KR | 20120119936 A | 11/2012 | |
| NL | 1026332 C2 * | 12/2005 | ............. A23L 25/25 |
| NL | 1026332 C2 | 12/2005 | |
| WO | WO 1997/042827 A1 | 11/1997 | |
| WO | WO 2010/001101 A2 | 1/2010 | |
| WO | WO 2012/175930 A1 | 12/2012 | |
| WO | WO 2015/180706 A2 | 12/2015 | |

OTHER PUBLICATIONS

Anita-: "Bakwan Sayr—Vegetables Fritter Recipe | Daily Cooking Quest", Dec. 9, 2013, XP055733322, www.dailycookingquest.com, Retrieved from the internet: URL: https://dailycookingquest.com/bakwan-sayr-vegetables-fritter.html [retrieved on Sep. 23, 2020].
Labropoulos et al., "Preparation. Storage and Distribution of Coated and Uncoated Chicken Meat Products", International Journal of Food Engineering, May 22, 2013, 7 pages.
Bittman, Mark "How to Cook Everything," Wiley and Publishing, pp. 847 (Year: 1998).
Hareland, G.A. "Evaluation of Flour Particle Size Distribution by Laser Diffraction, Sieve Analysis and Near-infrared Reflectance Spectroscopy," Journal of Cereal Science, vol. 20, No. 2, Sep. 1, 1994, pp. 183-190.
Particle Size-US Sieve Series and Tyler Mesh Size Equivalents, AzoM.com; 3 pp 2009 (Year: 2002).
Peters, Jorien "Water-binding of protein particles," Sep. 2016, pp. 1, Fig. 28 (Year: 2016).
Supplemental Search Report of European Patent Application No. 17824715, dated Sep. 30, 2020 (5 pgs.).
Supplementary Partial European Search Report issued for European patent application No. 17824715.1, search dated Nov. 12, 2019.
Supplementary Search Report of European Patent Application No. 17824715, dated Jan. 23, 2020, 6 pages.
Office Action from corresponding European Patent Application No. 17824715.1, dated Sep. 30, 2020, 5 pgs.
Office Action from corresponding Canadian Application No. 3,030,188, dated Jun. 1, 2023, 6 pgs.

\* cited by examiner

*Primary Examiner* — Jyoti Chawla
(74) *Attorney, Agent, or Firm* — Crowell & Moring LLP

(57) ABSTRACT

A coated food substrate including a food substrate with a vegetable coating comprising vegetables which must not be either potato or corn, where the vegetables are in comminuted form and preferably have a particle size in the range of about 50 to 500 μm and where the comminuted vegetables may be applied as a coating which optionally may also include vegetable pieces in the range of about 0.5 to 2 mm in the largest cross-section.

19 Claims, No Drawings

VEGETABLE COATING FOR SELECTED FOOD SUBSTRATES AND SELECTED FOOD SUBSTRATES COATED THEREWITH

CROSS-REFERENCE TO RELATED APPLICATIONS

This application is a continuation of U.S. application Ser. No. 16/315,435, filed on Jan. 4, 2019, which is the U.S. National Stage application of PCT application no. PCT/US2017/039629, filed on Jun. 28, 2017, titled VEGETABLE COATING FOR SELECTED FOOD SUBSTRATES AND SELECTED FOOD SUBSTRATES COATED THEREIN, designating the United States, which claims the benefit of U.S. provisional application No. 62/359,938, filed Jul. 8, 2016, the contents of which are each incorporated herein by reference in their entirety.

FIELD

This disclosure relates to coatings for food substrates, and particularly to vegetable-containing coatings for selected food substrates and the resulting coated substrates.

BACKGROUND

There is a need to expand the range of natural, healthy prepared foods, including particularly snack foods, by providing new healthy coated food substrates that may serve as snack foods and for other purposes. It is very important to ensure that these new healthy coated food substrates are flavorful and attractive so that they obtain wide acceptance. Coatings within the present teaching meet these needs because they are natural and inherently healthy, because they produce coated substrates that are also natural and have enhanced taste, color and overall appearance, and because they are sure to experience strong consumer acceptance and demand.

SUMMARY

Embodiments of the invention, together with objects and advantages thereof, may best be understood with reference to the following description. These embodiments comprise new, healthy coatings for food substrates and the enhanced coated food substrates prepared with these coatings. Embodiments also comprise methods for making the coatings.

Vegetables and Vegetable Powders

The vegetables that may be used in making the vegetable coating include pulses as well as any other vegetables (other than potato and corn) that are either available in powder form or can be reduced to powder form by drying (in air or by freeze-drying) and milling. Currently, the following vegetables are preferred: red beet, parsnip, green pea (*Pisum sativum*), horseradish, broccoli, carrot, sweet potato, spinach, bell pepper, cauliflower, cabbage and pulses. Preferred pulses are beans, lentils, chickpeas, and green peas.

The vegetables are used in comminuted form. The particle size of the comminuted vegetables should be between about 50 and 500 μm and preferably will be between about 100 and 200 μm. Particle size is currently believed to be critical to ensure proper adhesion of the coating to the substrate.

Coating Composition

The coating should be applied as a batter containing flours, starches, salts, and sugars. The coating batter may optionally also include rising agents, oils, colors, and anti-caking agents.

Optionally, vegetable pieces in the range of about 0.5-2 mm in largest cross-section can also be included in the coating composition. When such vegetable pieces are included, they should be present at a level of about 0.1-5.0 percent by weight of the total coating weight and preferably about 0.5-1.5 percent by weight of the total coating weight. The vegetable pieces may be one or more of red beet, parsnip, green pea (*Pisum sativum*), horseradish, broccoli, carrot, sweet potato, spinach, bell pepper, cauliflower, cabbage and pulses.

The coating compositions will contain the following ingredients in the noted ranges by weight based on the total weight of the coating:

| Ingredient | Broad Range | Preferred Range |
|---|---|---|
| vegetable powder | about 10-30% | about 12-20% |
| rice flour | about 20-70% | about 15-40% |
| sugar | about 5-12% | about 5-10% |
| salt | about 1-6% | about 2-3% |
| waxy corn starch | about 10-50% | about 15-30% |
| waxy potato starch | about 10-50% | about 15-30% |
| corn starch | about 10-25% | about 10-20% |
| wheat flour | about 15-60% | about 15-40% |
| wheat starch | about 10-25% | about 10-20% |
| vegetable oil | about 0-1.5% | about 0.1-0.5% |

The sugar may be in an icing or crystal form. The salt may be in a micro or table form. The waxy corn and waxy potato starch may be native or instant. Either waxy corn or potato starch combinations thereof are used, so long as the total level is in the range of about 15-50% by weight. The cornstarch may be native or instant.

One vegetable coating batter that has been successfully employed in coating a peanut substrate in a drum coating process is set forth below:

| Ingredient | Percent by Weight of Total Composition |
|---|---|
| parsnip root | 15% |
| rice flour | 48.6% |
| sunflower oil | 0.4% |
| powdered sugar | 8% |
| salt | 3% |
| waxy starch | 5% |
| instant starch | 10% |
| potato starch | 10% |
| TOTAL | 100% |

Food Substrates and Coating Process

The food substrate may be a snack substrate such as nuts, treenuts, seeds, chips, rice cakes, popcorn, crackers, tortillas, and extruded snacks, and snack substrates developed in the future. The substrate may also be made of or comprise poultry, beef, pork or fish. Currently, peanuts and tree nuts without shell are preferred substrates.

Any currently available coating method can be used such as a continuous nut coating process like that provided by a Kuipers nv line or an appropriate horizontal or vertical drum coating process. Batch coating processes may also be used. Once the coating is applied it can be set by baking in an oven or by frying in a deep fat fryer at a temperature of about 150-200° C. and preferably at a temperature of about 160-170° C. Less preferably, the coated food substrate can be fried.

Vegetable coatings as described above, when applied to substrates as taught herein, will adhere well to the substrates.

And, the resulting coated substrates will be natural and inherently healthy, and will have greatly enhanced taste, color and overall appearance. These new coated substrates will experience strong consumer acceptance and demand.

The use of any examples or exemplary language provided herein is intended to better illuminate the invention and does not pose a limitation on its scope. It should be understood that the illustrated embodiments are exemplary only, and should not be taken as limiting the scope of the invention. Recitation of ranges of values herein are intended to serve as a shorthand method of referring individually to each separate value falling within the range, and each separate value is incorporated into the specification as if it were individually recited herein.

What is claimed is:

1. A coated food substrate comprising:
   a food substrate; and
   a vegetable coating including dried, milled vegetable in comminuted form, where the vegetable is neither potato nor corn;
   wherein the vegetable coating is in the form of a batter containing flours, starches, salts, and sugars, the starches including waxy corn starch and/or waxy potato starch in an amount of 5-60% by weight of the vegetable coating;
   wherein the batter includes additional vegetable pieces in the range of 0.5-2 mm in their largest cross-section, wherein the vegetable pieces are chosen from the group consisting of red beet, parsnip, green pea (*Pisum sativum*), horseradish, broccoli, carrot, sweet potato, spinach, bell pepper, cauliflower, cabbage and pulses, and
   wherein the batter is applied to the substrate in a continuous or batch coating process and is set by baking the batter in an oven.

2. The coated food substrate of claim 1 in which the vegetable in comminuted form is present at a level of 10-30 percent by weight of the total vegetable coating batter.

3. A coated food substrate comprising:
   a food substrate; and
   a batter applied to the substrate comprising each of the following ingredients by weight percent of the total coating not to exceed 100%

| | |
   |---|---|
   | vegetable powder | about 10-30% |
   | rice flour | about 20-70% |
   | sugar | about 5-12% |
   | salt | about 1-6% |
   | waxy corn starch | about 10-50% |
   | waxy potato starch | about 10-50% |
   | corn starch | about 10-25% |
   | wheat flour | about 15-60% |
   | wheat starch | about 10-25% |
   | vegetable oil | about 0-1.5% | wherein the vegetable powder is dried, milled vegetable in comminuted form that is neither potato nor corn; and
   wherein the vegetable in comminuted form is chosen from the group consisting of red beet, parsnip, green pea (*Pisum sativum*), horseradish, broccoli, carrot, sweet potato, spinach, bell pepper, cauliflower, cabbage and pulses.

4. The coated food substrate of claim 3 in which the vegetable in comminuted form is a pulse chosen from the group consisting of beans, lentils, chickpeas, and green peas.

5. The coated food substrate of claim 3 in which the particle size of the vegetable in comminuted form is in the range of about 50 to 500 μm.

6. The coated food substrate of claim 3 in which the particle size of the vegetable in comminuted form is in the range of about 100 to 200 μm.

7. The coated food substrate of claim 3 in which the batter also includes one or more of rising agents, oils, colors, and anti-caking agents.

8. The coated food substrate of claim 3 in which the substrate is chosen from the group consisting of nuts, treenuts, seeds, chips, rice cakes, popcorn, crackers, tortillas, and extruded snacks, and snack substrates developed in the future.

9. The coated food substrate of claim 3 in which the substrate is chosen from the group consisting of poultry, beef, pork or fish.

10. The coated food substrate of claim 3 in which the substrate is chosen from the group consisting of peanuts and tree nuts without shells.

11. The coated food substrate of claim 3 in which the batter comprises each of the following ingredients by weight percent of the total coating not to exceed 100%

| | |
    |---|---|
    | vegetable powder | about 12-20% |
    | rice flour | about 15-40% |
    | sugar | about 5-10% |
    | salt | about 2-3% |
    | waxy corn starch | about 15-30% |
    | waxy potato starch | about 15-30% |
    | corn starch | about 10-20% |
    | wheat flour | about 15-40% |
    | wheat starch | about 10-20% |
    | vegetable oil | about 0.1-0.5% |

12. The coated food substrate of claim 3 including either waxy corn starch, waxy potato starch, or combinations thereof wherein the total amount is in the range of about 15-50% by weight.

13. The coated food substrate of claim 3 wherein the batter is drum-coated on the substrate.

14. The coated food substrate of claim 3 in which the vegetable coating is in the form of a batter applied to the substrate in a continuous or batch coating process which is set by baking in an oven or by frying in a deep fat fryer.

15. The coated food substrate of claim 3 wherein the batter includes additional vegetable pieces in the range of 0.5-2 mm in their largest cross-section, wherein the vegetable pieces are chosen from the group consisting of red beet, parsnip, green pea (*Pisum sativum*), horseradish, broccoli, carrot, sweet potato, spinach, bell pepper, cauliflower, cabbage and pulses.

16. The coated food substrate of claim 15 in which the additional vegetable pieces are present at a level of about 0.1-5.0 percent by weight of the total vegetable coating batter.

17. The coated food substrate of claim 15 in which the additional vegetable pieces are present at a level of about 0.5-1.5 percent by weight of the vegetable coating batter.

18. A coated food substrate comprising:
a food substrate; and
a coating applied to the substrate comprising each of the following ingredients by weight percent of the total coating:

| | |
|---|---|
| parsnip root | 15% |
| rice flour | 48.6% |
| sunflower oil | 0.4% |
| powdered sugar | 8% |
| salt | 3% |
| waxy starch | 5% |
| instant starch | 10% |
| potato starch | 10% | wherein the vegetable powder is dried, milled vegetable in comminuted form that is neither potato nor corn; and
    wherein the vegetable in comminuted form is chosen from the group consisting of red beet, parsnip, green pea (*Pisum sativum*), horseradish, broccoli, carrot, sweet potato, spinach, bell pepper, cauliflower, cabbage and pulses.

19. The coated food substrate of claim 18 in which the vegetable powder is parsnip root.

\* \* \* \* \*